April 27, 1954  K. A. DOUTT  2,677,034
FLASH WELDER CONTROL MEANS
Filed Nov. 8, 1948  12 Sheets-Sheet 1
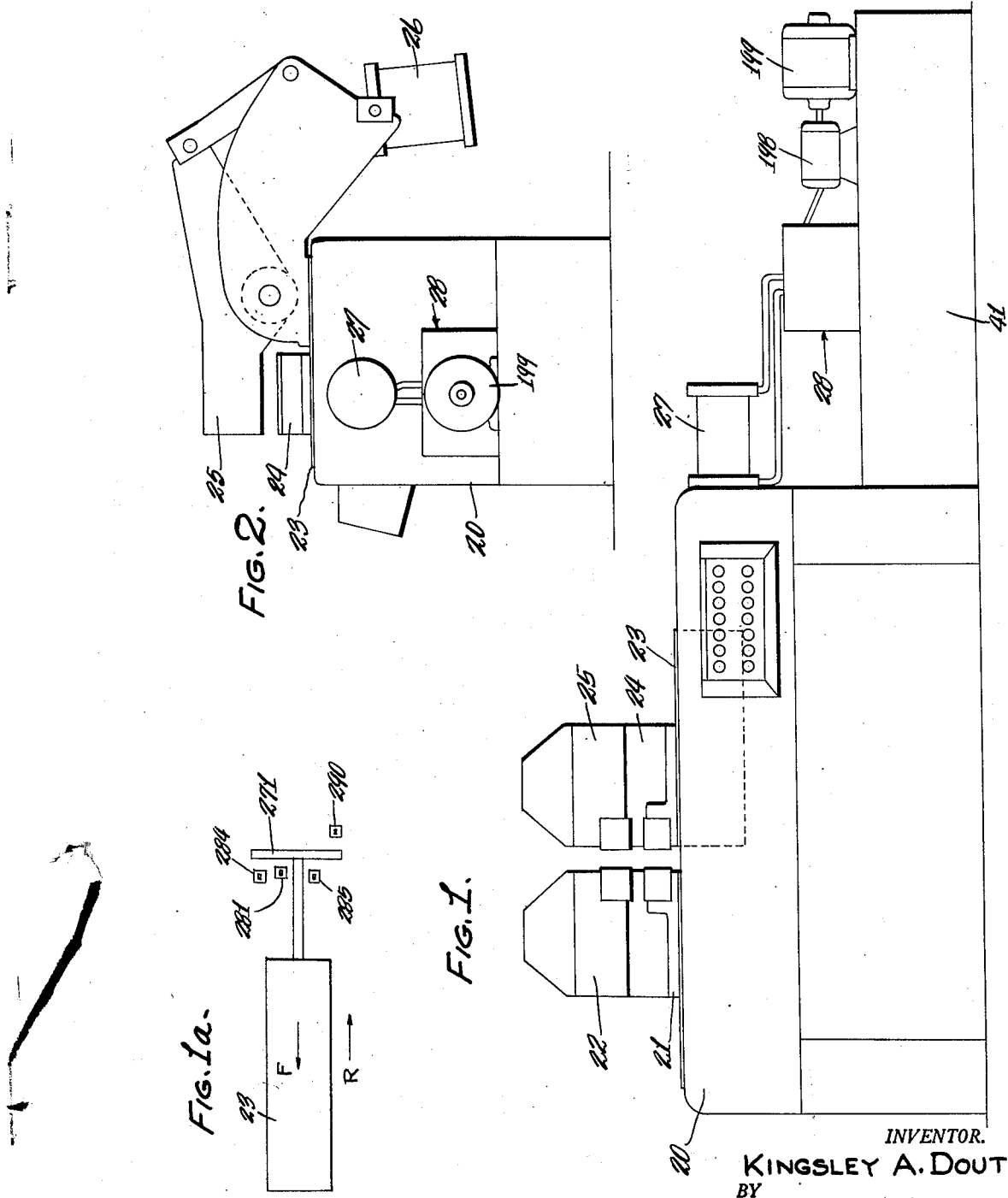
INVENTOR.
KINGSLEY A. DOUTT
BY
*Michael Williams*
ATTORNEY April 27, 1954  K. A. DOUTT  2,677,034
FLASH WELDER CONTROL MEANS
Filed Nov. 8, 1948  12 Sheets-Sheet 2
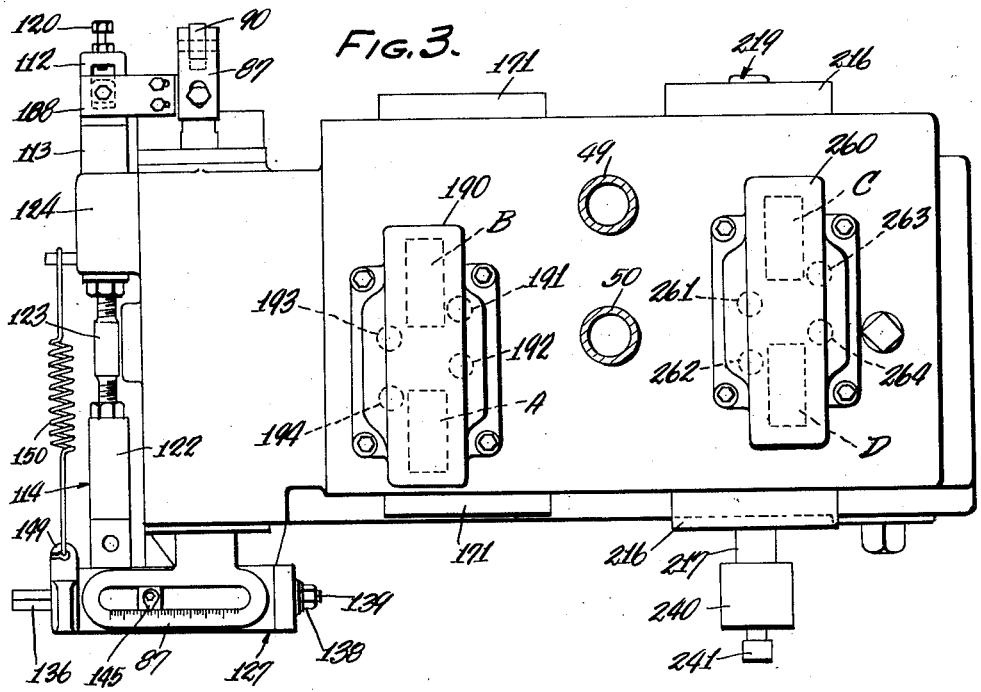
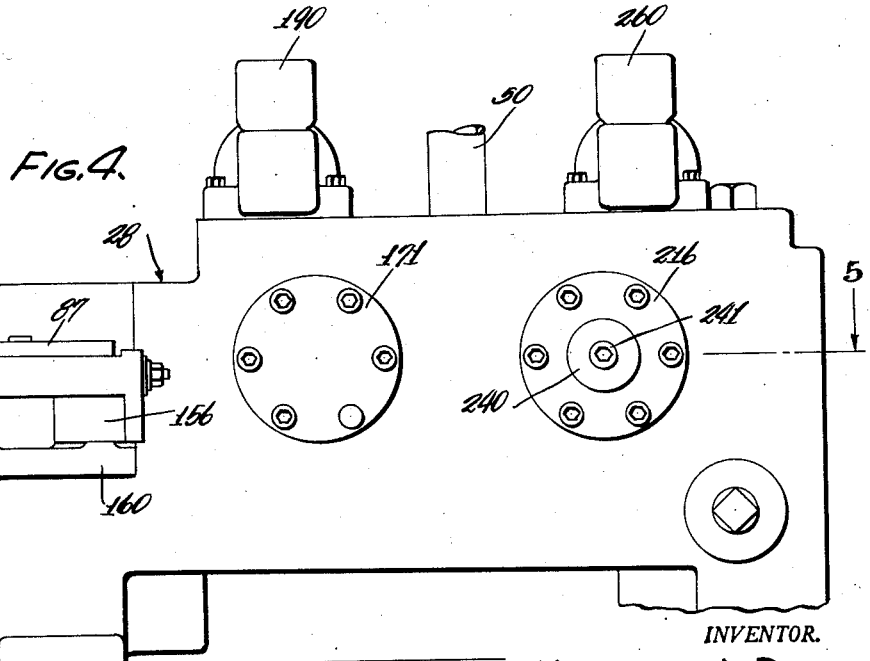
INVENTOR.
KINGSLEY A. DOUTT
BY Michael Williams
ATTORNEY

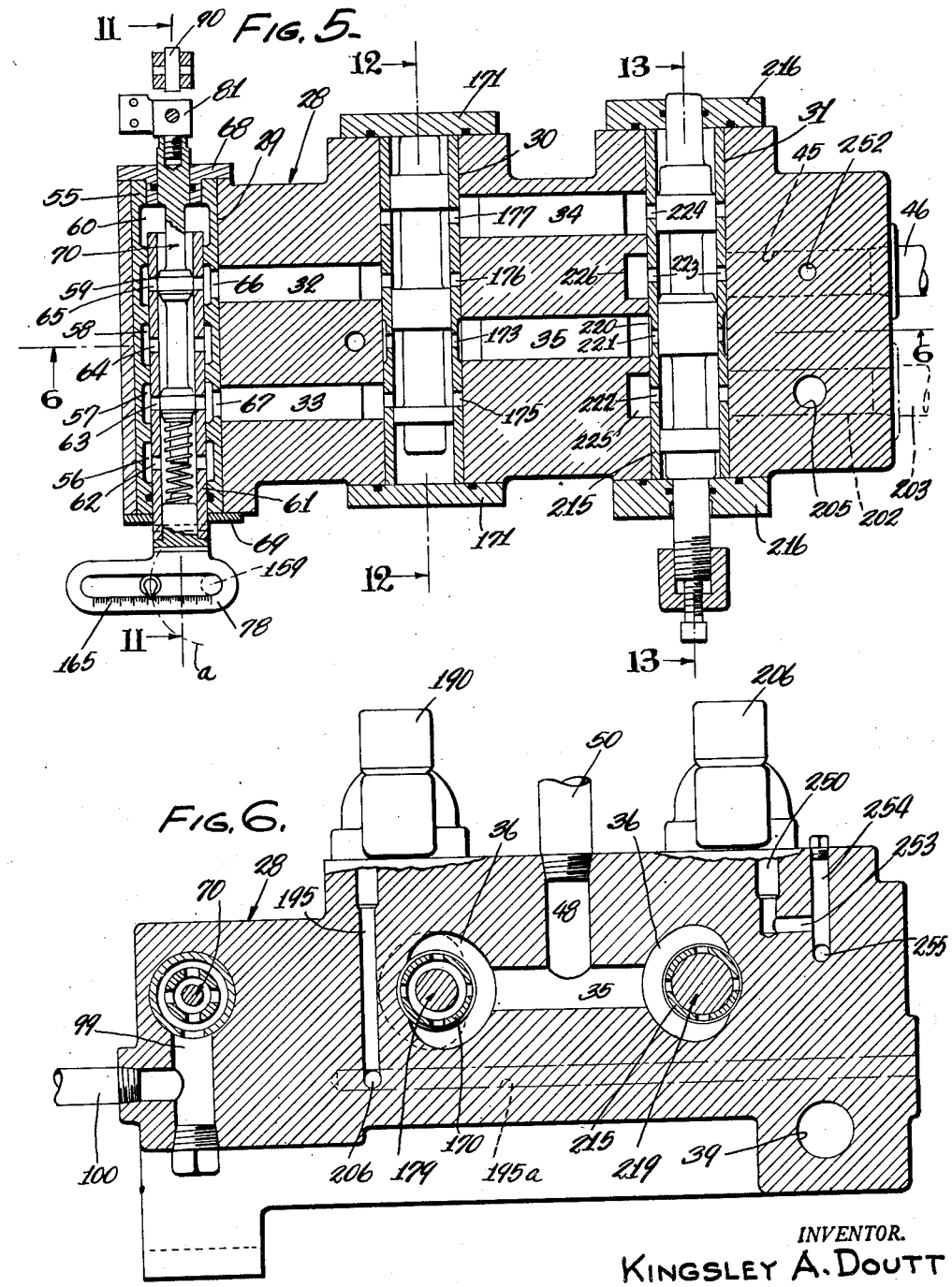

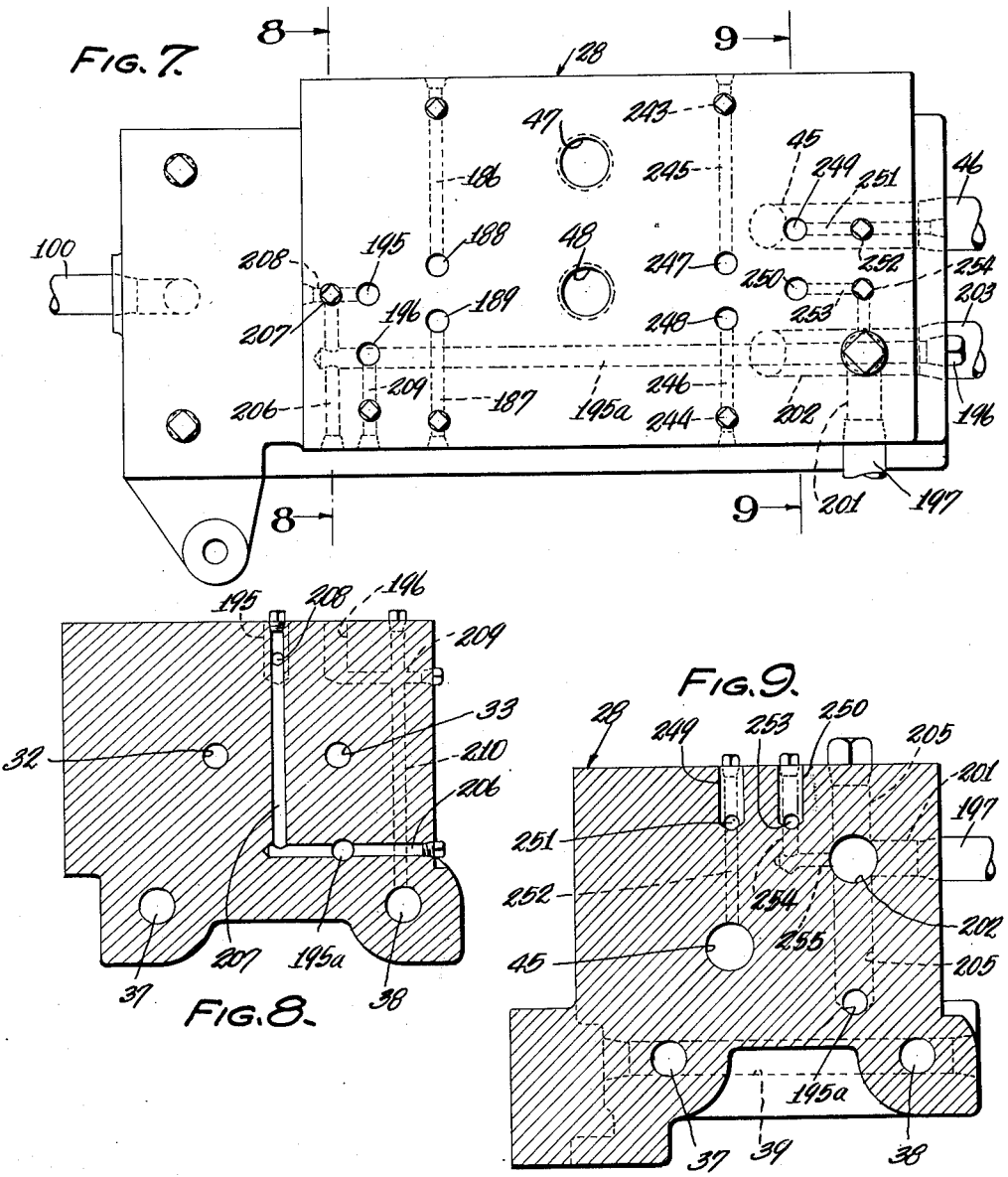

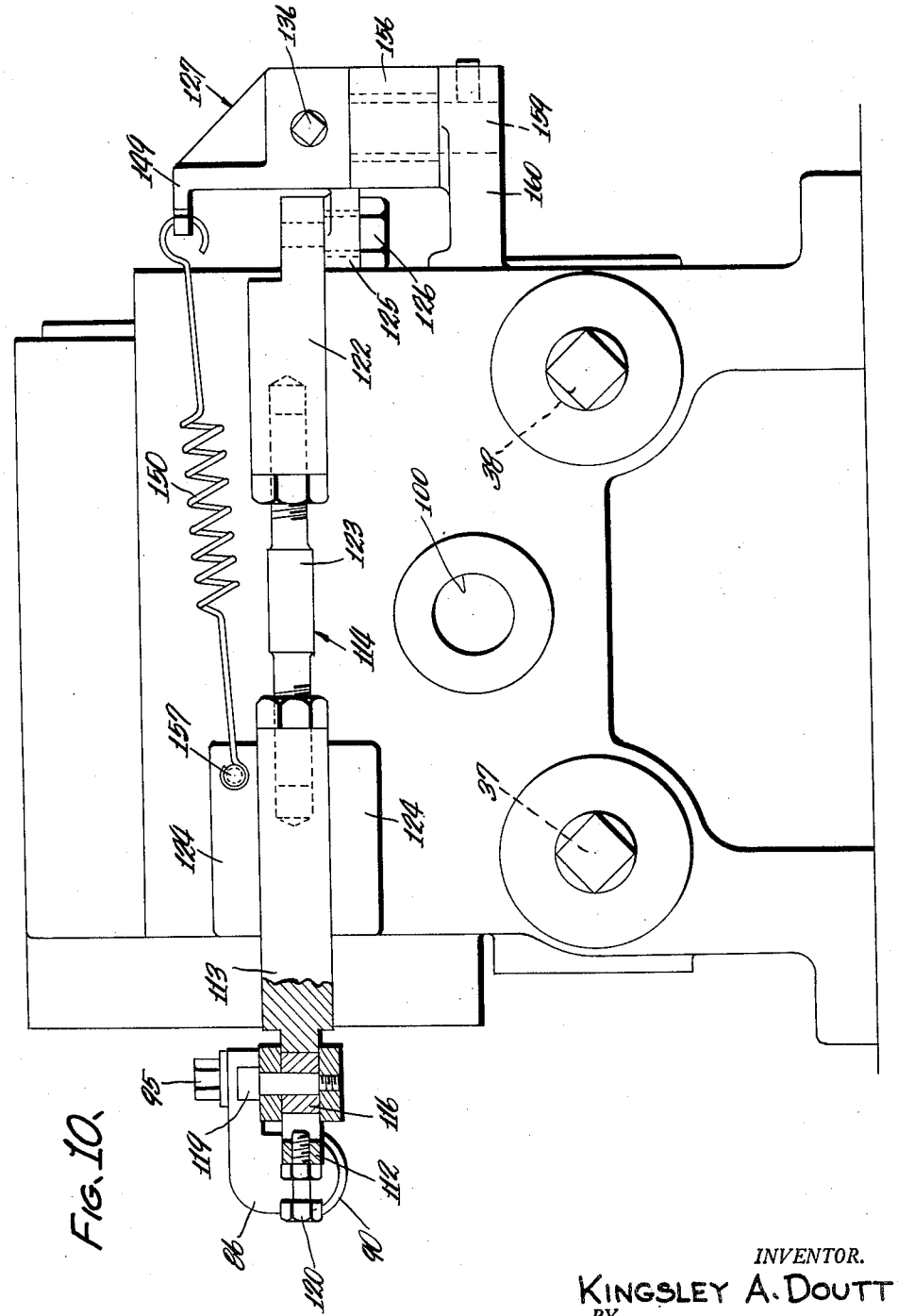

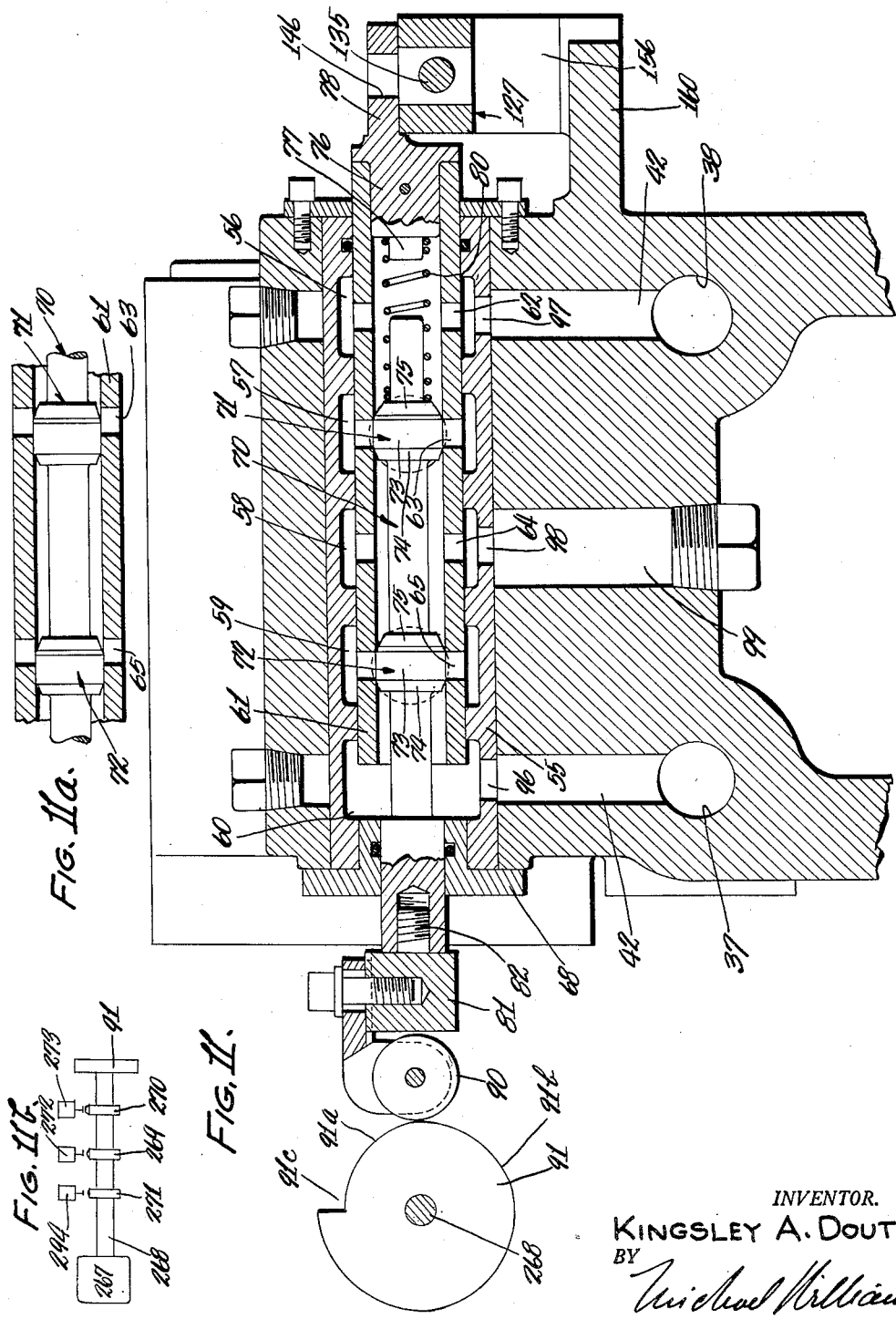

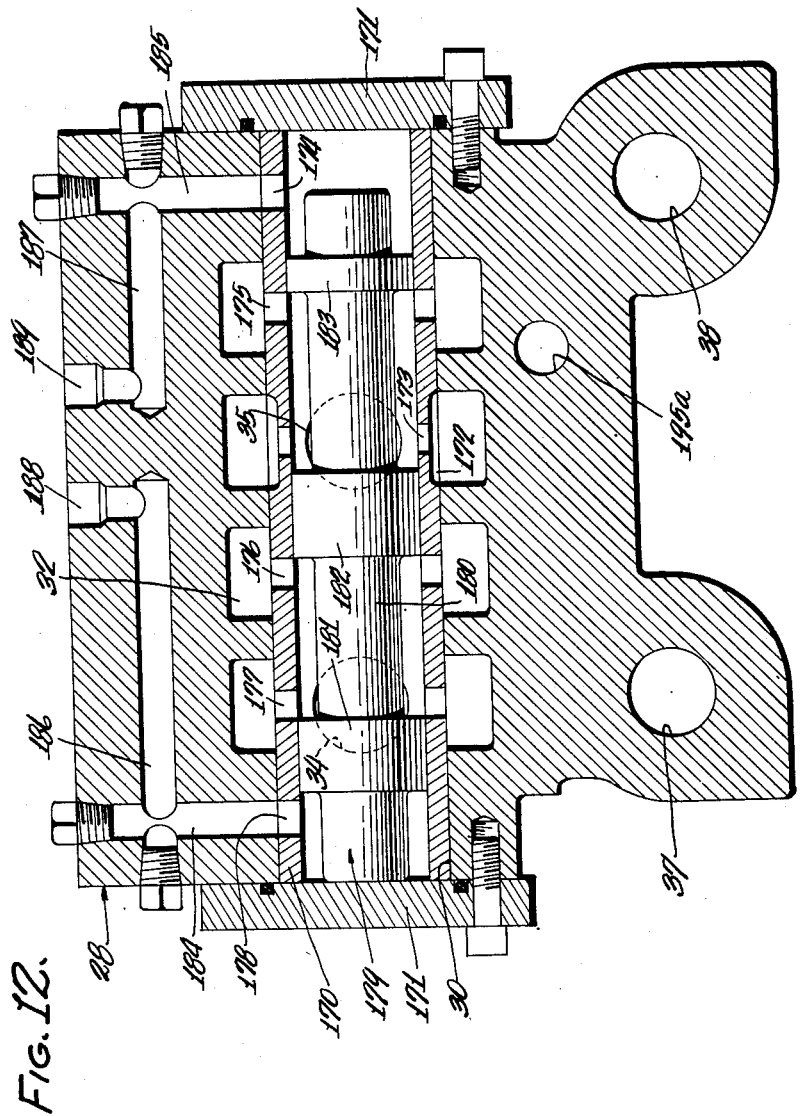

April 27, 1954 K. A. DOUTT 2,677,034
FLASH WELDER CONTROL MEANS
Filed Nov. 8, 1948 12 Sheets-Sheet 8
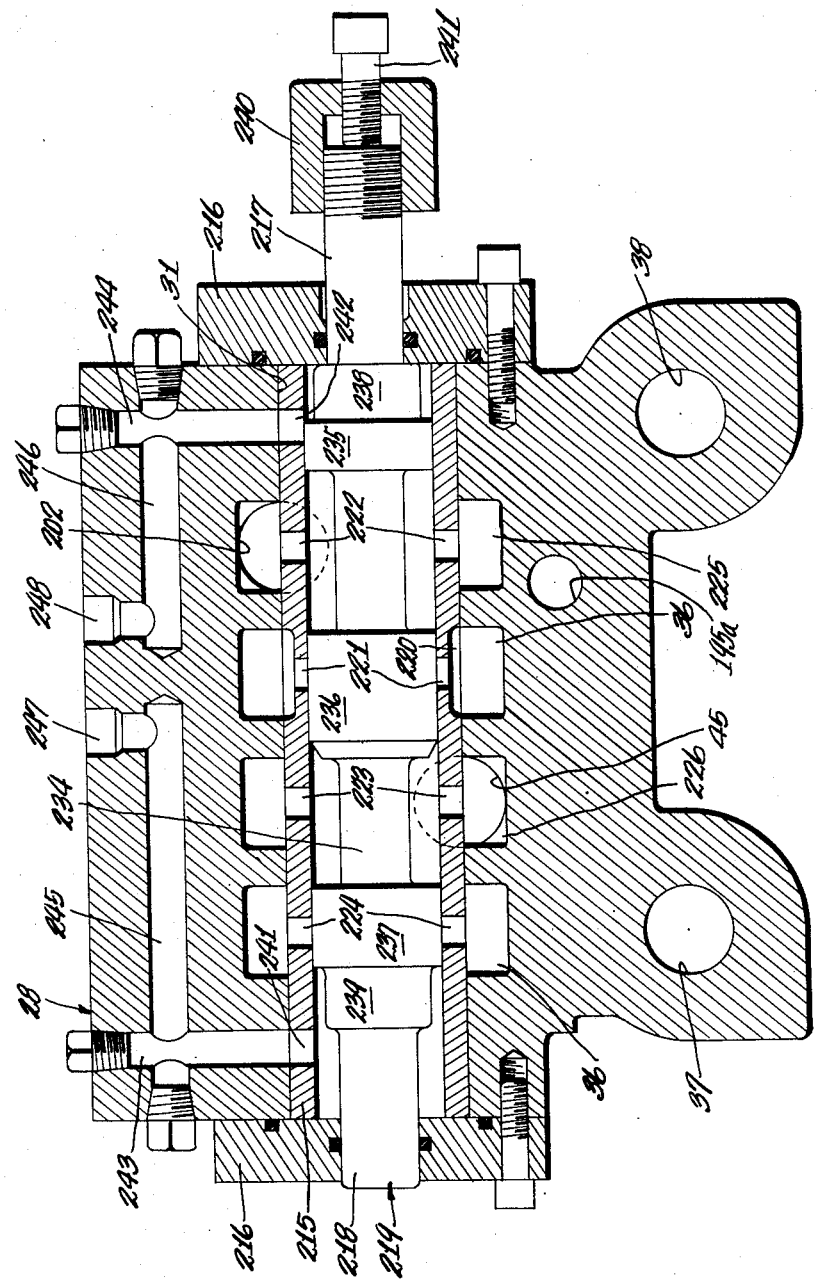
INVENTOR.
KINGSLEY A. DOUTT
BY
ATTORNEY

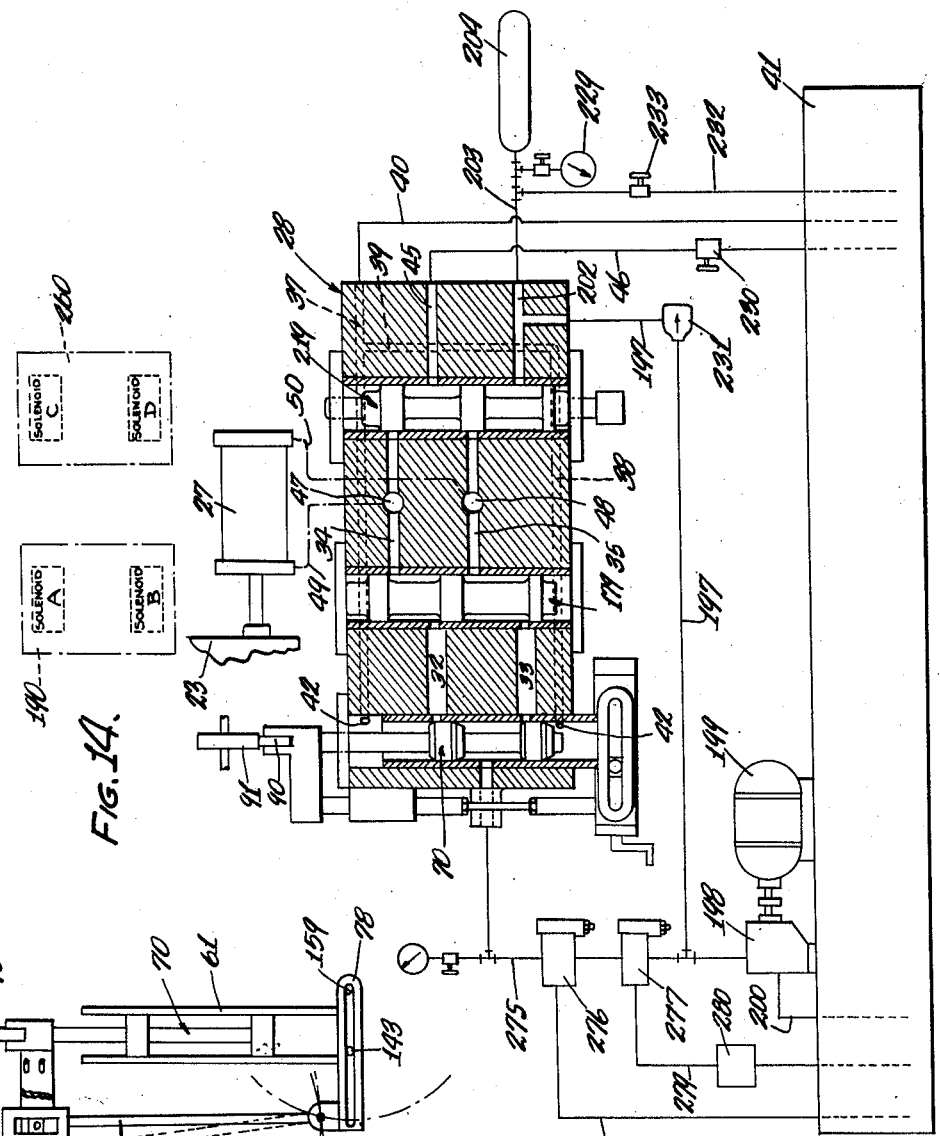

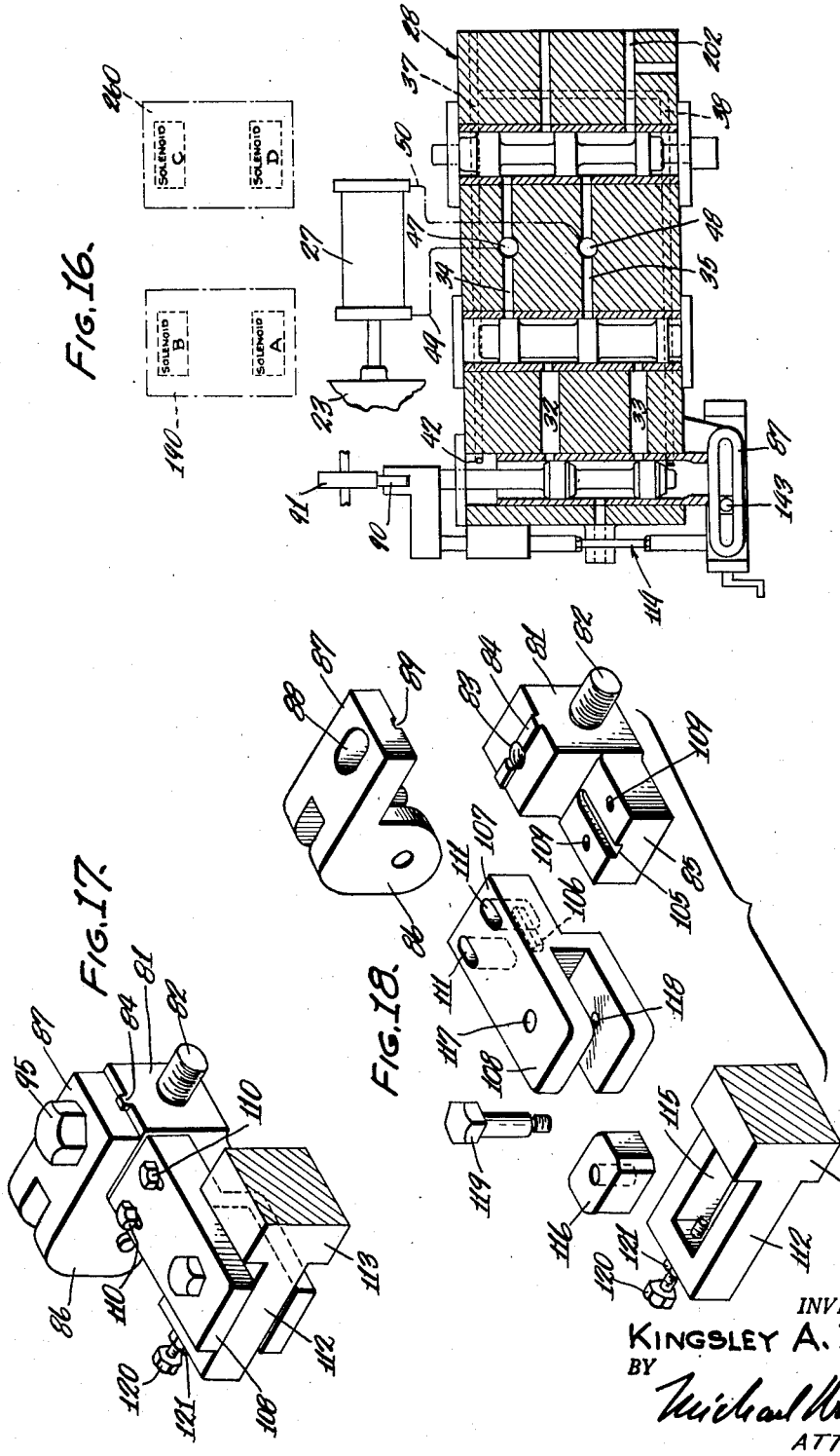

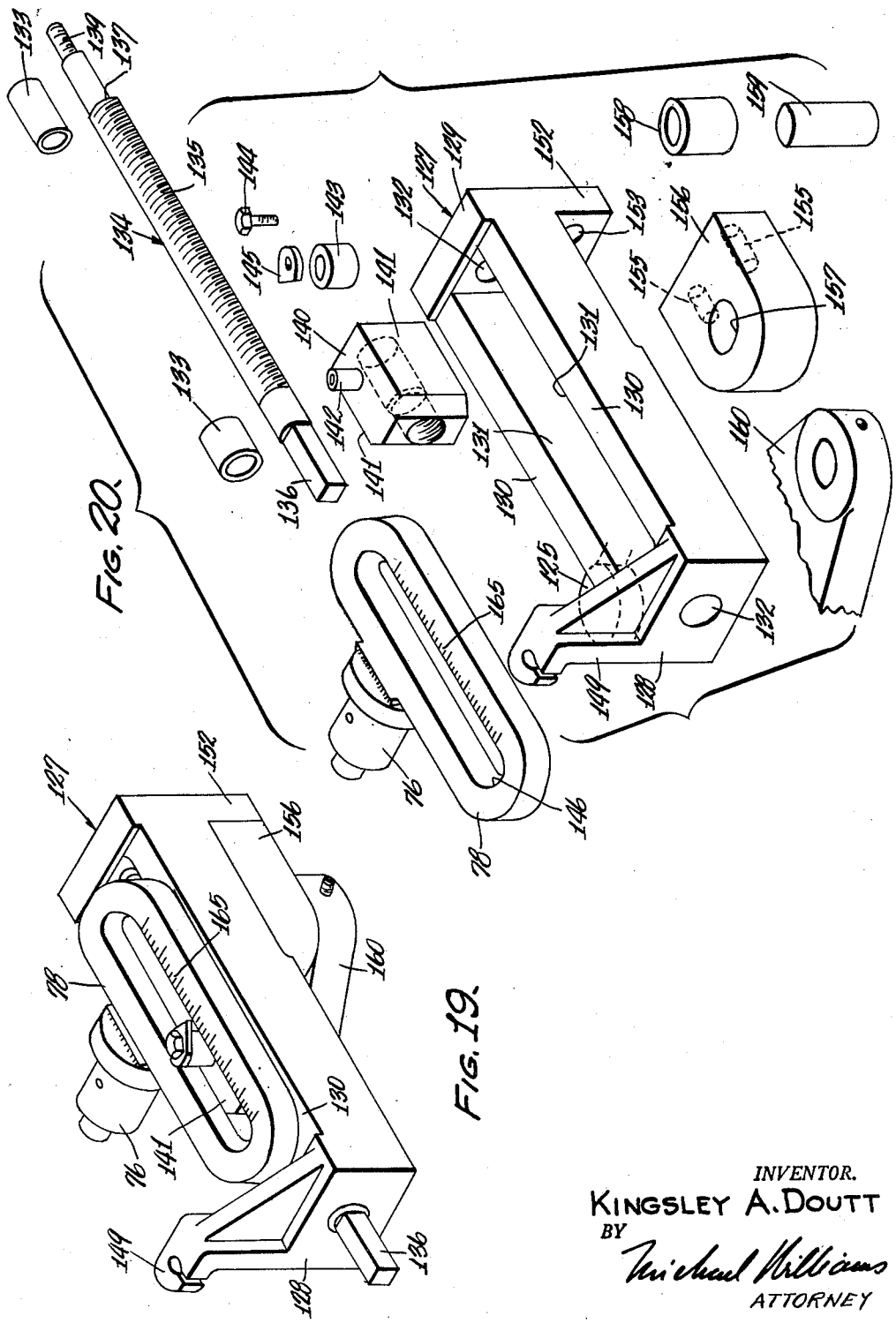

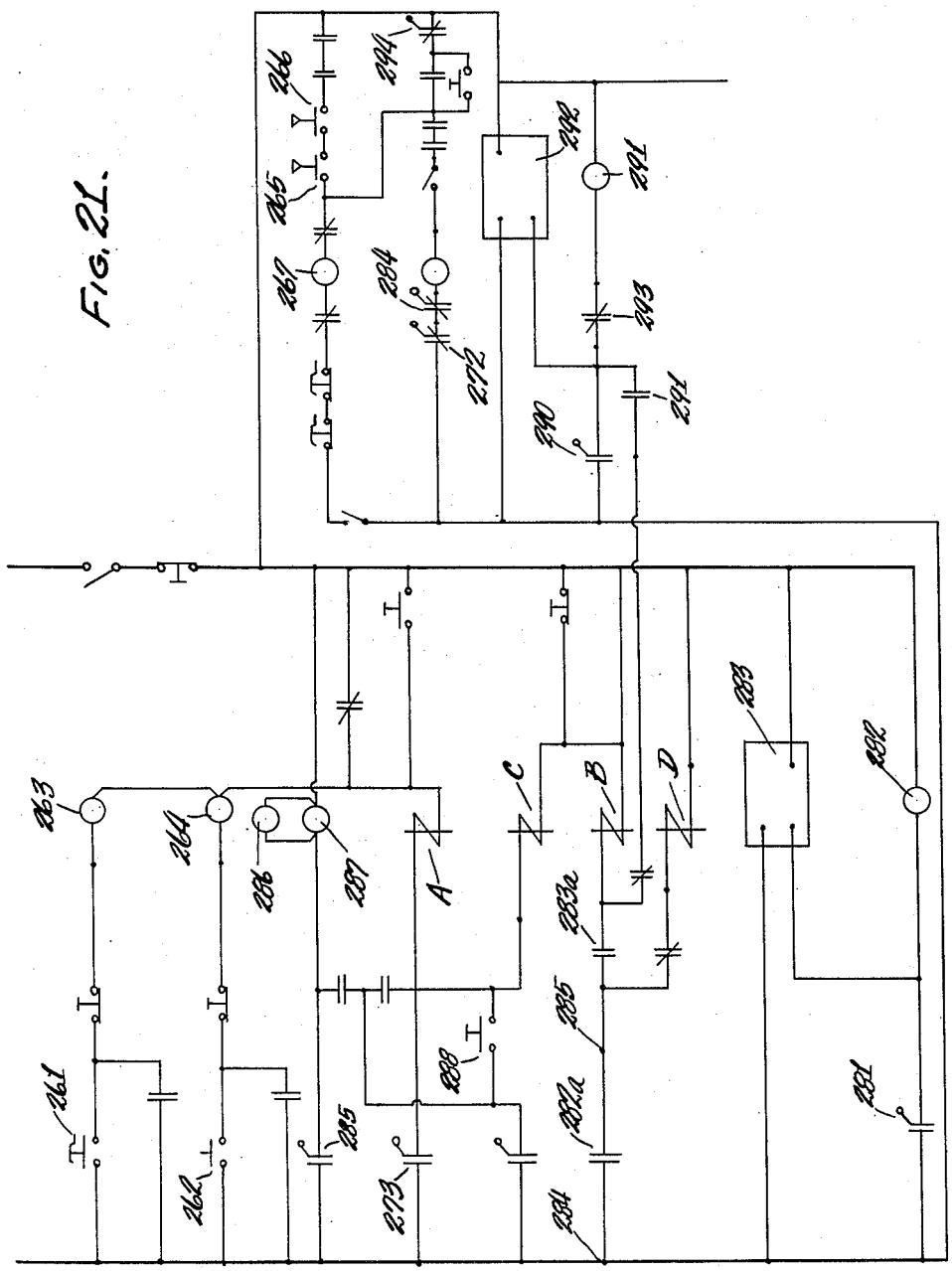

Patented Apr. 27, 1954

2,677,034

UNITED STATES PATENT OFFICE 2,677,034

FLASH WELDER CONTROL MEANS

Kingsley A. Doutt, Cortland, Ohio, assignor to Federal Machine and Welder Company, Warren, Ohio, a corporation of Ohio Application November 8, 1948, Serial No. 58,845

12 Claims. (Cl. 219—4)

1

My invention relates to control valves, more particularly to control valves for electric resistance welding apparatus, and the principal object of my invention is to provide new and improved control valves of this character.

In the drawings accompanying this specification, and forming a part of this application, there is shown, for purposes of illustration, an embodiment which my invention may assume, and in these drawings:

Figure 1 is a schematic side elevational view of a flash welder, showing one application of my invention, Figure 1a is a fragmentary schematic view of a switching arrangement, Figure 2 is an end elevational view of the structure shown in Figure 1, Figure 3 is an enlarged top plan view of the control valve which forms the subject matter of my invention, Figure 4 is a side elevational view of the valve shown in Figure 3, Figure 5 is a sectional view corresponding generally to the line 5—5 of Figure 4, Figure 6 is a sectional view corresponding generally to the line 6—6 of Figure 5, Figure 7 is a plan view of the valve body, with certain cooperating parts omitted, Figures 8 and 9 are sectional views respectively corresponding generally to the lines 8—8 and 9—9 of Figure 7, Figure 10 is an enlarged end elevational view of the control valve, with parts shown in section, Figure 11 is an enlarged sectional view corresponding generally to the line 11—11 of Figure 5, Figure 11a is a fragmentary sectional view, showing parts of Figure 11 in a starting position, Figure 11b is a schematic view of a switching arrangement, Figure 12 is an enlarged sectional view corresponding generally to the line 12—12 of Figure 5, Figure 13 is an enlarged sectional view corresponding generally to the line 13—13 of Figure 5, Figure 14 is a generally schematic view, with parts in section, showing the valve in one position, Figure 15 is a generally schematic view of a detail, with parts shown in section, Figure 16 is a view similar to Figure 14, with parts in another position, and with parts omitted, Figure 17 is an enlarged perspective view of an adjustment construction, Figure 18 is an exploded perspective view showing the parts comprising the adjustment shown in Figure 17,

2

Figure 19 is an enlarged perspective view of another adjustment construction,

Figure 20 is an exploded perspective view of the parts comprising the adjustment shown in Figure 19, and Figure 21 is an electrical wiring diagram used in the control of the valve.

Referring to Figures 1 and 2, the embodiment of my invention is shown as used with a flash welder, although it will be appreciated that such showing is for illustration purposes, and that my invention has uses other than that particularly disclosed herein.

A flash welder of usual construction comprises a base 20 supporting various mechanism, certain of which need not be described to understand the herein disclosed application of the invention.

Mounted on the base is a pair of jaws 21 and 22, the jaw 21 being fixed rigidly with the base, and the jaw 22 being mounted for pivotal movement with respect to the jaw 21. These jaws comprise the stationary work engaging clamps.

Slidable with respect to the base is a platen 23 carrying a pair of jaws 24 and 25, the jaw 24 being fixed rigidly with the platen 23, and the jaw 25 being mounted for pivotal movement with respect to the jaw 24. These jaws comprise the movable work engaging clamps.

Fluid means, such as the air cylinder 26, may be used to effect clamping and unclamping action of each pair of jaws. In operation, one piece of work may be clamped in the jaws 21, 22 and the other piece of work may be clamped in the jaws 24, 25. The platen is then actuated so as to move the work clamped in the jaws 24, 25 toward the work clamped in the jaws 21, 22. At a predetermined time, electrical current is passed between the pairs of jaws, thus heating the adjoining ends of the work to fusion temperature, and pressure is applied to effect the weld. The application of current and pressure, and the termination of such application, depends largely on whether it is intended to butt weld or flash weld the metal pieces of work.

Fluid means, such as the hydraulic cylinder 27, is usually provided to effect movement of the platen 23, and my invention is herein shown as applied to control of actuation of such cylinder.

Referring particularly to Figures 5 and 6, the herein disclosed embodiment of my invention comprises a valve body 28, having spaced-apart cross-bores 29, 30 and 31. The bore 29 has communication with the bore 30 through passages 32 and 33, and the bore 30 has communication with the bore 31 through passages 34 and 35. As best seen in Figure 6, the bores 30 and 31, at portions in line with the passages 34, 35, have enlargements 36 to facilitate communication during operation of valve members hereinafter to be described.

As best illustrated in Figure 14, a pair of exhaust passages 37 and 38 extend longitudinally of the body 28, at a lower portion thereof, the passages being connected together by a cross-passage 39, and communicating with line 40 which is adapted to return fluid to a reservoir 41. The passages 37 and 38 communicate with opposite ends of the cross-bore 29, by means of upright passages 42. Fluid from the bore 31 is exhausted by a passage 45 connected to a line 46 leading to the reservoir 41. Extending upwardly in the body 28 from respective passages 34, 35 are two passages 47, 48 which are respectively connected to lines 49, 50 leading to opposite ends of the cylinder 27.

Referring particularly to Figures 5, 6 and 11, a sleeve 55 is fixed within the bore 29 and has annular undercut spaced-apart portions 56, 57, 58, 59, 60 forming lands therebetween. A sleeve 61 is slidable within the sleeve 55, having sliding engagement with certain of the lands mentioned, and the sleeve 61 has sets of spaced-apart apertures 62, 63, 64, and 65 adapted respectively to communicate with the undercut portions 56, 57, 58, and 59. The sleeve 55 has two openings 66 and 67 adapted respectively to establish communication with the passages 32 and 33. A shouldered plate 68 closes one end of the sleeve 55, and a plate 69 closes the other end of this sleeve.

Slidable within the sleeve 61 is a valve spool 70 comprising a rod portion of smaller diameter than the interior of the sleeve 61, and a pair of spaced-apart valve members 71, 72, each having a cylindrical portion 73. Each end of each cylindrical portion 73 tapers off therefrom, one end having taper 74, and the other end having a double taper 75.

A plug 76 is pinned into and closes one end of the sleeve 61, and has a reduced end 77 extending into the sleeve. An elongated, slotted plate 78 extends from the plug 76, for a purpose later to be described. The rod portion of the valve spool 70 stops short of the reduced end 77, and a coil spring 80 is disposed over adjoining ends and interposed between shoulders formed by the valve member 71 and the plug 76, urging the valve spool 70 away from the plug 76. The end of the valve spool 70 opposite the plug 76 slidably passes through the shouldered plate 68. A block 81 is secured to this end of the spool, as by means of a screw stud 82 threaded into a recess in the spool.

The block 81 (see especially Figures 17 and 18) is provided with a central, vertically extending screw-threaded aperture 83, and a key 84 is integrally formed therewith and extends from the top surface. The block 81 also has a step portion 85 extending laterally thereof, for a purpose later to be explained.

A yoke 86 is adapted to be secured to the block 81, and comprises a ledge 87 having an elongated slot 88 passing therethrough, and a keyway 89 formed in its lower surface. A roller 90 (Figure 11) is journalled between the legs of the yoke 86, this roller being adapted to cooperate with a rotatable flashing cam 91. The ledge 87 seats on top of block 81, with the key 84 fitting within the keyway 89. A bolt 95 passes through the slot 88 and is threaded into the aperture 83. It will be appreciated that the slot 88 will provide for adjustment of the ledge 87 relative to the block 81 along a line defined by the key 84.

The sleeves 55, and 61 and the valve spool 70, for purposes of reference only, will hereinafter be collectively referred to as the flashing control valve.

As best seen in Figure 11, the sleeve 55 has openings 96, 97 respectively establishing communication with the exhaust passages 42, and the sleeve also has an opening 98 establishing communication with a passage 99 which is connected with a line 100 (see Figures 6 and 14) leading from a source of fluid pressure.

Referring again to Figures 17 and 18, the step portion 85 which extends laterally with respect to the block 81 is formed with a keyway 105 adapted to receive a key 106 extending from the under surface of a ledge 107 which is part of a yoke 108. The step portion 85 has a pair of screw-threaded apertures 109 adapted to receive the threaded ends of bolts 110 which also pass through elongated apertures 111 formed in the ledge 107. This construction provides for adjustment of the yoke 108 laterally of the block 81 for a purpose later to appear.

The spaced legs of the yoke 108 receive therebetween a tongue 112 formed on one end 113 of a link 114 (see Figure 10). The tongue 112 is formed with an elongated slot 115 which receives a slide block 116. The yoke 108 has a pair of apertures 117 and 118 formed in opposed legs, the aperture 118 being threaded to receive the threaded end of a bolt 119, the shank of which is unthreaded and forms a pivot point about which the slide block 116, and link 114, may swing. A stud 120 is threaded through one end of the tongue 112, and has its end directed toward the slide block 116, to provide for adjustment of the rearward travel of the block 116. A lock nut 121 holds the stud 120 in adjusted position.

The link 114, as best seen in Figure 10, comprises ends 113 and 122 joined together by a turnbuckle 123, so that the distance between ends 112 and 122 may be varied. Movement of the link 114 is guided by slide bearings 124 carried by the valve body 28. The end 122 of the link 114 is pivotally connected to an ear 125 by means of a shoulder bolt 126.

Referring particularly to Figures 19 and 20, the ear 125 is integrally connected to and extends laterally from a slide box 127, which comprises ends 128, 129 and sides 130 which form therebetween spaced-apart slide surfaces 131. The ends 128, 129 have aligned apertures 132 into which are press-fitted bearings 133. These bearings journal a jack shaft 134 which has a threaded portion 135 and a squared end 136. The shaft is held against axial movement by a shoulder 137 adapted to bear against an adjoining surface of the slide box 127, and by a nut 138 (see Figure 3) threaded on a threaded extremity 139 of the shaft. It will be appreciated that suitable thrust washers will be interposed between the shoulder 137 and nut 138 and the adjoining surfaces of the slide box 127 to prevent binding of the shaft against rotative movement.

A slide nut 140 is threaded on the shaft 134, opposite surfaces 141 of the nut having sliding engagement with respective surfaces 131 of the slide box 127. Extending upwardly from the slide nut is a pintle 142 about which is journalled a roller 143. The roller 143 is held in position on the pintle 142 by means of a stud 144 which is threaded into an opening in the pintle. A pointer 145 is also held in position by the stud 144. The roller 143 is adapted to ride in a slot 146 formed in the plate 78 which is formed integral with the plug 76 secured to the sleeve 61 (see Figure 11).

The end 128 of the slide box 127 has an upwardly extending bracket 149 to which one end of a coil spring 150 is secured (see Figure 10) the opposite end of this spring being anchored to a stud 157 carried by one of the slide bearings 124. The spring 150 is provided to yieldably hold the slide box 127 in its initial position.

As best seen in Figures 19 and 20, the lower portion 152 of the end 129 of the slide box 127 is formed with a pair of apertures 153 (only one being visible in Figure 20) for passing bolts which are threaded into apertures 155 formed in a bearing block 156, so that the block is rigidly held to the end 127. The block 156 is formed with an aperture 157 into which is press-fitted a bearing 158 to form a journal for a pin 159. The pin 159 is rigidly carried by an ear 160 which is integrally with and extends laterally from the valve body 28.

With respect to the construction just described, it will be appreciated that the slide nut 140 may be adjusted to any desired position within the slide box 127, by proper rotation of the shaft 134. Adjustment may be made so that the axis of the roller 143 is directly in line with the axis of the pin 159, or is spaced therefrom a progressively increasing distance, the setting of the roller 143 being readable upon a scale 165 on the plate 78. The roller 143 forms the connection between the slide box 127 and the plate 78, the slide box 127 pivoting about the pin 159 and transmitting movement to the plate 78 only when the roller 143 is displaced from axial alignment with the pin 159, the movement being dependant upon the amount the roller 143 is displaced from the axis of the pin 159.

Prior to engagement of the flashing cam 91 with the roller 90, the springs 80 and 150 have returned the valve spool 70 and the sleeve 61 to positions shown in Figure 11a, wherein the valve members 71, 72 have moved rearwardly to uncover ports 63, 65 to permit fluid (oil in this case) under pressure to pass from inlet pipe 100 through passage 99 to undercut portion 58, through ports 64 and interior of sleeve 61, past valve member 72, through ports 65, undercut portion 59, through port 66, and through passage 32 (Figure 5). This effects a rearward or retracting movement of the platen, under certain conditions to be later explained. Returning fluid will flow through passage 33 (Figure 5) port 67 and enlargement 57 in sleeve 55, port 63 of sleeve 61 (Figure 11) past valve member 71 to the interior of sleeve 61, through port 62 in sleeve 61, enlargement 56 and ports 97 in sleeve 55, through passage 42 and to exhaust 38.

In operation, when the flashing cam 91 (see Figure 11) is rotated so that its cam surface 91a presses against the roller 90 to urge the valve spool 70 against the action of the spring 80, the spool 70 will quickly move to the position shown in Figures 5 and 11, because the cam surface 91a has a fast rise. In such position, the valve members 71, 72 block all flow from the inlet pipe 100 through any of the valve ports. Such initial movement of the spool 70 will not affect movement of the sleeve 61 since the block 116 (see Figure 18) must travel a short distance in the slot 115 formed in the tongue 112 of the link 114, in order to bear against the forward defining surface of the slot. Movement of the block 116, through movement of the spool 70, it will be appreciated, is effected by reason of the connection of the block 116 with the yoke 108 carried by the block 81 which is secured by the valve spool 70.

When the block 116 has bottomed in the slot 115, continuing action of the cam surface 91b on the roller 90 will move the valve spool 70 and also effect forward (or downward with respect to relation of parts shown in Figure 5) movement of the link 114.

Movement of the link 114 effects pivotal movement of the slide box 127 about pivot 159. When the roller 143 is positioned directly in axial alignment with the pin 159, the slide box 127 will turn about the pin 159, but no movement will be imparted to the plate 78 and thus there will be no movement of the sleeve 61, so that only the valve spool 70 is moved by action of the flashing cam 91. In such case, the valve spool moves relative to the then stationary sleeve 61 so that the tapered portions 74 of valve members 71, 72 gradually uncover ports 63 and 65 in the sleeve 61. Thus, fluid under pressure may flow from inlet pipe 100, through passage 99 (see Figure 11) port 98 in sleeve 55, undercut portion 58, ports 64 of sleeve 61, through the interior of sleeve 61, past valve member 71, through ports 63 in sleeve 61, undercut portion 57 and port 67 in sleeve 55, and through passage 33 (Figure 5). Simultaneously, fluid may flow from passage 32 through port 66 and undercut portion 59 in sleeve 55, through port 65 in sleeve 61 (Figure 11) past valve member 72, through the interior of sleeve 61 to the interior of sleeve 55 at under cut portion 60, through port 96 in sleeve 55, through passage 42, and to exhaust passage 37.

When the roller 143 is moved from axial alignment with pin 159, as for example to the position shown in Figure 5, the flashing cam surface 91b moves valve spool 70 and also link 114, and this link will cause the slide box 127 to pivot about pin 159, but such pivoting action will now cause forward (or downward as viewed in Figure 5) movement of the sleeve 61, because the roller 143 will swing about an arc "a" (Figure 5). However, in this position of parts the valve spool will still travel relative to the sleeve 61, despite the fact that both are now moving, although it will be appreciated that the opening of valve ports will be at a lesser rate of speed than when the roller 143 was in alignment with the axis of the pin 159. Infinite relative adjustment may be effected, until the roller is positioned at the extreme end (left end in Figure 5) of the slot 146 in the plate 78, wherein it will be substantially in direct alignment with the forward pivot of the link 114, which forward pivot is formed by the bolt 126, and in such case the sleeve 61 and spool 70 will travel substantially in unison and no port opening will be effected.

From the foregoing, it will be obvious that the roller 143 may be adjusted along the slot 146 in the plate 78, merely by rotating the screw 134, to effect proper movement of the slide nut 140 in the slide box 127. Thus, a great range of valve port openings is easily provided, without requiring replacement of any part.

When the flashing cam 91 has rotated 360°, the roller 90 will drop into the cam recess 91c (see Figure 11) and the springs 80 and 150 will return the valve spool 70 and sleeve 61 to their starting positions, as shown in Figure 11a. Rearward movement of the sleeve 61 may be regulated by proper adjustment of the screw stud 120 (Figures 17 and 18) so that the slide block 116 abuts the stud end and comes to rest in any desired position in the slot 115 of the tongue 112. Thus, it may be possible to restrict movement of the slide block 116 in the slot 115, so that the valve spool 70 and link 114 always start their movement at the same time.

Further differential relative movement is provided for between the valve spool 70 and the sleeve 61, at the start of movement by the flashing cam 91, by means of the adjustment provided by the elongated slots 111 (see Figures 17 and 18) in the yoke 108 Shifting of the yoke 108 toward or away from the axis of the valve spool 70 will cause the slide block 116 to slightly change its position in the slot 115 of the tongue 112, as suggested in general manner in Figure 15, thus providing a longer lever arm (shown in dotted lines) and this longer lever arm is at an angle with respect to its shorter straight line position shown in full lines.

In the position shown in full lines, the arm (or link 114) will swing along an arc $L_1$, whereas in the dotted line position, the arm will swing along an arc $L_2$, the arcs intersecting at the pin 125, but diverging on either side of such pin. The amount of this divergence causes the arm, in dotted line position, to act with the plate 78 in the form of a double toggle at the very start of movement of the sleeve 61, so that at this time the sleeve has more movement than it would have if the arm were in straight line position, and therefore the flashing valve ports do not open as quickly for a corresponding movement of the flashing cam at the start of flashing operation. This provides a control over the acceleration of the platen 23 at the start of flashing and when the work is cold. Such control is extremely desirable, because one of the most critical times of flashing is at the start, because cold work offers less electrical resistance than when hot. The offset position of the link 114 (dotted line position in Figure 15) is also used when welding material of high electrical conductivity, or closely concentrated weld area, and in the case of the latter less end preparation is necessary for bulky weld areas.

Fitting within the cross-bore 30 of the valve body 28 is a valve which for reference only will be called the blocking valve and fitting in the cross-bore 31 is a valve which also for reference will be called the upset control valve.

Referring particularly to Figures 5, 6 and 12, the blocking valve comprises a sleeve 170 fitting within the cross-bore 30. End plates 171 are bolted to the valve body 28, and close off the ends of the sleeve 170 and cross-bore 30. The sleeve 170 is formed with an under-cut portion 172 and ports 173 communicating with such portion. The sleeve is also formed with ports 174, 175, 176, 177, and 178.

A valve spool 179 is arranged within the sleeve 170 for sliding movement axially thereto. The spool comprises a body portion 180 of lesser diameter than the interior diameter of the sleeve 170, and three valve members 181, 182 and 183. The passages 32 and 33 are also provided with enlargements, as seen in Figure 12, adjacent to the sleeve 170, to facilitate fluid flow.

The valve body 28 has two generally upright bores 184, 185 disposed at opposite ends of the cross-bore 30, these passages communicating with the interior of sleeve 170 through respective ports 178, 174. Two bores 186, 187 extend inwardly from opposite sides of the valve body and respectively communicate with the bores 184 and 185. The bores 186, 187 stop short of each other and respectively communicate with upright bores 188, 189 which lead to the top surface of the valve body 28. The bores 184, 185, 186 and 187 are suitably plugged, so that fluid passages are provided from bores 188, 189 to opposite ends of the sleeve 170.

As seen in Figure 5, passage 33 communicates with ports 175, passage 35 communicates with under-cut portion 172 and ports 173, passage 32 communicates with ports 176, and passage 34 communicates with ports 177.

A solenoid operated pilot valve 190 (see especially Figures 3 and 4) has ports 191, 192 communicating with respective ports 188, 189 of valve body 28. The valve 190 also has ports 193, 194 communicating with ports 195, 196 (see Figures 7, 8 and 9) which lead into the valve body 28 from the upper surface thereof. Any suitable pilot valve may be used, and since such valve per se forms no part of this invention, detailed description thereof will not be provided. However, as an example, for purpose of full disclosure, a valve of type DG 5S4-062, manufactured by Vickers, Incorporated, has been successfully used. Briefly, the pilot valve 190 is of the four way balanced spool type, the spool being shifted by solenoids A and B.

As best seen in Figures 7, 8 and 9, a bore 195a is drilled lengthwise of the body 28 and inwardly from one end thereof (the right end in Figure 7) and the right end of the bore 195a is closed by a plug 196. A line 197, termed the high-pressure line, leads directly from the fluid pump 198 (Figure 14) which is driven by a motor 199. The pump has a line 200 to pass fluid from the reservoir 41. The line 197 communicates with a bore 201 in the body 28, and such bore communicates with a bore 202 which communicates with a line 203 leading from a pressure accumulator 204 (Figure 14). A vertical bore 205, plugged at its upper end, establishes fluid communication between the line 197 and the bore 195a.

A transverse bore 206 cuts through the bore 195a at the left (Figure 7) end of the latter, and communicates with an upright bore 207. The upright bore communicates with a short bore 208 which leads to the bore 195. Thus, fluid communication is established from the relatively high pressure source to the bore 195. The bore 196 communicates with a short transverse bore 209 which in turn communicates with a vertical bore 210 leading to drain passage 38.

As suggested in Figures 3 and 7, ports 195, 196, 188 and 189 of valve body 28 are respectively in communication with ports 193, 194, 191 and 192 of valve 190. The valve 190 is so designed that when solenoid B is energized, the valve spool will shift to establish inlet-fluid communication between valve body ports 195 and 188 and exhaust-fluid communication between valve body ports 196 and 189, and the fluid pressure will flow through bores 186, 184, port 178 (Figure 12) and bear against valve member 181 to urge the valve spool 179 to the right, as viewed in Figure 12. Since the valve spool of valve 190 is of the balanced type, the solenoid B need only be energized for a short period of time.

When solenoid A is energized, the valve 190 is so designed that its valve spool will shift to establish inlet-fluid communication between valve body ports 195 and 189, and exhaust-fluid communication between valve body ports 196 and 188, and the fluid under pressure will flow through bores 187, 185 port 174 (Figure 12) and bear against valve member 183 to urge the valve spool 179 to the left, as viewed in Figure 12. The valve spool 179 is limited in its axial movement by abutment of its ends with the closure plates 171.

In the position of valve spool 179, as shown in Figures 5, 12 and 14, inlet-fluid from the flashing valve may flow through passage 33, through port 175, through the space between valve members 182 and 183, through port 173, undercut portion 172, passage 35 to passage 48, fluid line 50, to the rear of the piston in the cylinder 27, so as to urge the platen in a direction wherein the opposing ends of the work to be welded are moved toward each other for flashing action.

Likewise, with the valve spool 179 in the position shown in Figures 5, 12 and 14 fluid exhausted from the cylinder 27 will flow through line 49, passage 47, passage 34, ports 177, the space between valve members 181 and 182 of spool 179, port 176, passage 32, ports 66 and 65, by valve member 72 of spool 70 and to exhaust through passages 42 and 37 in valve body 28. With valve spool 179 in position (see Figure 16) opposite to that shown in Figures 5, 12 and 14, valve member 182 will close port 173 to block flow of fluid to passage 35, and valve member 181 will close port 177 to block flow of fluid from passage 34, and thus no movement is imparted to the piston of cylinder 27 by fluid from the flashing valve.

The upset control valve, fitting within the crossbore 31 of the valve body 28, comprises a sleeve 215 (see especially Figures 5 and 13). End plates 216 are bolted to the valve body, to close the ends of the sleeve 215, but in this case the plates 216 are apertures to slidably pass ends 217 and 218 of a valve spool 219 which is slidably mounted within the sleeve 215.

The sleeve 215 is formed with an undercut portion 220 and ports 221 communicating with the passage 35, and is also formed with ports 222, 223, and 224. Passages 34 and 35 are formed with enlargements 36, as previously described. Ports 222 and 223 are respectively in communication with enlargements 225 and 226 of respective passages 202 and 45. The passages 202 and 45 are respectively above and below the plane of the section shown in Figure 5, although in the general view shown in Figure 14, such passages are shown in the same plane, for purposes of clarity. As before explained, the passage or bore 202 is connected to a line 203 which leads to the pressure accumulator 204. A pressure gauge 229 (Figure 4) may be inserted in line 203 to indicate pressure in the accumulator. A needle valve 230 is preferably inserted in line 46, to provide regulation of the return flow of fluid to the reservoir 41. A check valve 231 is inserted in line 197, to limit fluid flow in the direction shown by the arrow on the check valve. For purposes of draining the accumulator 204, a line 232 leads from line 203 to reservoir 41, a shut-off valve 233 being interposed in line 232.

The valve spool 219 of the upset control valve is formed with a body portion 234 of less diameter than the interior diameter of the sleeve 215, and with three valve members 235, 236 and 237. The valve members 235 and 237 have respective enlargements 238 and 239, forming shoulders with respective ends 217 and 218, the shoulders being adapted to abut against the interior surface of respective end plates 216 to limit movement of the valve spool. The end 217 has a threaded extremity, on which is threaded a cup-shaped member 240. A stud 241 threads through the bottom of the member 240, and bears against the end of the threaded extremity, to lock the member 240 in adjusted position. The member 240 provides for adjustment of movement of the valve spool 219 to the left, as viewed in Figure 13, by reason of abutment of its end surface with the exterior surface of adjacent plate 216.

Sleeve 215 is also formed with ports 241 and 242 at its opposite ends, as best shown in Figure 13. Such ports respectively communicate with upright bores 243 and 244 in valve body 28. Horizontal bores 245 and 246 extend inwardly from each side of the valve body, and respectively intersect bores 243 and 244. Bores 245 and 246 stop short of meeting, and respectively communicate with short upright bores 247 and 248 leading to the upper surface of valve body 28.

Referring particularly to Figures 7 and 9, a pair of short upright bores 249 and 250 lead inwardly from the upper surface of the valve body 28, and are disposed adjacent to the bores 247 and 248. The bore 249 communicates with a horizontal bore 251, and this latter bore communicates with an upright bore 252 leading to the passage 45 which is connected to the reservoir 41 by pipe 46. The bore 250 communicates with a horizontal bore 253, and this latter bore communicates with a vertical bore 254 which in turn communicates with a horizontal bore 255 leading to the bore 205 which connects with high pressure line 197. The bores are suitably plugged, as shown, so that the bore 250 is in communication with fluid under relatively high pressure from line 197, and bore 249 is connected to exhaust line 45.

A valve 260 (Figure 3) similar to the valve 190, is positioned on the upper surface of the valve body 28, so that its ports 261, 262, 263 and 264 are respectively in direct communication with the short upright ports 247, 248, 249 and 250 formed in the valve body 28. The valve 260 has solenoids C and D which are adapted to be selectively energized to shift its spool.

When solenoid C is energized, the spool of valve 260 will shift to connect port 250 with port 247 and port 248 with port 249. Thus, fluid under pressure flows through bores 245 and 243 (Figure 13), port 241 to the interior of sleeve 215, and bears against the adjacent surface of valve member 237 to move valve spool 219 to the position shown in Figure 13. At the same time, fluid in back of valve member 235 is exhausted from sleeve 215 through port 242, bores 244, 246 and 248, passage 45, line 46, to reservoir 41.

When solenoid D is energized, the spool of valve 260 is shifted to place valve body ports 248 and 250 in communication and valve body ports 247 and 249 in communication. In this condition of ports, fluid under pressure will flow through ports 248, 246, 244, 242 to the interior of sleeve 215 and bear against the adjacent surface of valve member 235 to force the valve spool 219 to the left, as viewed in Figure 13 until either the enlargement 239 bears against the interior surface of adjacent plate 216, or cup-shaped member 240 bears against the exterior surface of adjacent plate 216. At the same time, fluid will be exhausted from sleeve 215 through ports 241, 243, 245, 247, passage 45, line 46, and to reservoir 41.

With the valve spool 219 in the position shown in Figures 13 and 14, it will be noted, referring to Figure 14, that fluid under pressure from the accumulator 204 may enter the sleeve 215, but such fluid is prevented from flowing to the passage 35 because the valve member 236 blocks the ports 221. Likewise, fluid from passage 34 may not be exhausted through sleeve 215, because valve member 237 blocks ports 224.

When the valve spool 219 is shifted from position shown in Figures 13 and 14, to its opposite position, shown in Figure 16, valve members 236 and 237 permit fluid flow through respective ports 221 and 224. Thus, fluid under pressure from the accumulator 204 may flow through passage 202, ports 222 to the interior of sleeve 215, and through ports 221 to passage 35, passage 48, line 50, to the rear of the piston in cylinder 27. Likewise, fluid from in front of the piston in cylinder 27 may flow through line 49, passages 47 and 34, ports 224 to the interior of sleeve 215, through ports 223, passage 45, line 46, to the reservoir 41. The needle valve 230 regulates the speed of movement of the piston in the cylinder 27, and consequently the speed of movement of the platen 23, during the time accumulator pressure is applied to the piston in cylinder 27, by regulating the escape of fluid from the cylinder to the reservoir 41.

It will be appreciated that the blocking valve is moved to interrupt fluid flow from the flashing valve through the passages 34, 35 at the time the upset control valve established fluid flow from the accumulator 204 and drain from the cylinder 27 through passages 34, 35. Preferably, the upset control valve establishes fluid flow from the accumulator just prior to the time the blocking valve interrupts fluid flow from the flashing valve, so as to provide uninterrupted pressure on the piston of the cylinder 27, and thus avoid any hesitation in the upsetting action.

Means are provided for synchronizing operation of the flashing valve, the blocking valve, and the upset control valve, and the electrical diagram disclosed in Figure 21 shows a circuit for such purpose.

In operation, the motor 199 of the pump 198 is started by means of a manual starter which may be of any well known type and therefore need not be described. The work to be welded is then placed in the dies 21—22 and 24—25, and the respective dies are moved to clamp respective work pieces. Electrically, this may be effected by depressing a foot switch comprising parts 261 and 262 (Figure 21) which actuate relays 263 and 264 for effecting operation of clamping-solenoid-air valves. When proper clamping pressure is reached, clamp pressure switches 265 and 266 will close and initiate an electrical circuit through the starter of the sequence motor 267.

The sequence motor 267 rotates a cam shaft 268 (Figure 11) carrying the flashing cam 91 and three fingers 269, 270, 271 (Figure 11b) which are adapted to operate respective limit switches. The weld start limit switch 272 (Figures 11b and 21) which was held open up to this point will now be closed by finger 269, so as to start weld current to flow to the welding dies, and the platen start limit switch 273 will be momentarily tripped by finger 270 to energize solenoid A of pilot valve 190 and also momentarily energize solenoid C of pilot valve 260 to insure that the spool of this latter valve is in proper position, so that the upset control is in closed position.

Energization of solenoid A of pilot valve 190 will cause opening of the blocking valve (positions shown in Figures 5 and 14). Since the sequence motor 267 is rotating the shaft 268, the flashing cam 91 is rotating to cause opening of the valve ports of the flashing valve, and this valve is shown at the start of flashing operations in Figures 5 and 11, the spool 70 and sleeve 61 already having moved relatively from their positions shown in Figure 11a.

In this condition of ports, fluid from line 100 passes through the gradually opening ports in sleeve 61 and passes through passage 33, through ports 175 of sleeve 170 of the blocking valve, through sleeve 170 to ports 173, through passages 35 and 48, line 50, to the rear of the piston in cylinder 27, so as to move the platen forwardly, whereby the sets of welding dies are caused to approach each other and cause flashing of the adjoining ends of the metal. Fluid in front of the piston in the cylinder 27 is exhausted through line 49, passages 47 and 34, ports 177, sleeve 170, ports 176 of the blocking valve, passage 32, ports 66, 65 of the flashing valve, through the interior of sleeve 61 to space 60, and thence downwardly through passage 42 to exhaust conduit 37.

At this time, it is pointed out that the fluid supply conduit 100 leads from a line 275 which is connected to the pump 198. Interposed in the line 275 is a pressure reducing valve 276 and a relief valve 277. A drain pipe 278 leads from the pressure reducing valve 276, to vent bypassed fluid to the reservoir 41. A drain pipe 279 leads from the relief valve 277 to vent bypassed fluid to the reservoir 41, and an oil cooler 280 is interposed in the line 279. The valves 276 and 277 are so set that fluid pressure entering line 100 is less than pressure of fluid flowing through line 197 which connects to line 275 in advance of relief valve 277, as is clearly shown in Figure 14. Thus, the upset pressure delivered by accumulator 204 will be greater than the flashing pressure delivered through line 100.

After a predetermined amount of flashing, by movement of platen 23 in the direction of the arrow F, Figure 1a, to cause movement of the articles between dies 24—25 and 21—22 in a direction toward and into engagement with each other, a T-cam 271 secured to the platen 23, as seen in Figure 1a, and movable therewith, closes the upset limit switch 281 to bring relay 282 into operation and also initiate time delay unit 283. Electrical contact between points 284 and 285, by actuation of points 282a of relay 282, brings solenoid D of valve 260 into the circuit, to open the upset control valve. After a very brief time, the time delay 283 times out and closes its contacts 293a thus energizing solenoid B of valve 190 to close the blocking valve. Thus upset pressure is applied to the platen prior to the time the flashing pressure is cut off, to thereby eliminate any ragged movement or hesitation of the platen.

Upsetting movement of the platen continues to a predetermined forward position, and at some time during the upsetting movement, the weld current is preferably cut-off by interengagement of the T-cam 271 with the current cut-off limit switch 284. Further movement of the platen 23 in the direction of the arrow F, Figure 1a, causes the T-cam 271 to engage and close forward stop limit switch 285, to energize relays 286 and 287 which in turn energize solenoid C of pilot valve 260 to close the upset control valve, and also energize solenoid A of pilot control valve 190 to open the blocking valve, and also de-energize the clamping solenoid valves.

Closure of platen return switch 288 energizes solenoid C of pilot valve 260. It is to be remembered that the action of de-energize or dropping out of any of the solenoids does not necessarily mean that any motion takes place, inasmuch as the valve spool of either valve 190 or 260 will remain at one end or the other, depending on which solenoid was last energized.

As the platen moves to reverse position, in the direction shown by arrow R in Figure 1a, the T-cam 271 will ride over the platen rear stop limit switch 290 to energize relay 291 and also time delay 292. Relay 291 energizes solenoid B of pilot valve 190 and stops platen reverse travel. After a short time, the time delay 292 times out to open contact 293 and thus de-energize relay 291. This de-energizes solenoid B of pilot valve 190. The machine is now in standby position, at rest and ready to begin a new weld cycle if desired. The time delay 292 will remain timed out until after the platen starts forward and moves the T-cam 271 off the reverse stop limit switch 290, at which time it will reset.

It should be noted that the sequence motor 267, which was started by the closing of the clamping pressure switches 265, 266, went through its operational cycle and was stopped by the finger 271 tripping the sequence stop limit switch 294. This was entirely independent of the platen travel except that the platen could not reach its full reverse position until the sequence motor had turned the flashing cam 91 around to start position, that is, the position wherein the cam follower 90 drops into the hollow spot 91c of the cam.

In view of the foregoing, it will be apparent to those skilled in the art that I have accomplished at least the principal object of my invention, and it also will be apparent to those skilled in the art that the embodiments herein described may be variously changed and modified, without departing from the spirit of the invention, and that the invention is capable of uses and has advantages not herein specifically described, hence it will be appreciated that the herein disclosed embodiment is illustrative only, and that my invention is not limited thereto.

I claim:

1. Means for controlling operation of fluid cylinder means, comprising: a valve body having a bore communicating with fluid inlet and outlet ports; a sleeve reciprocable within said bore; a spool reciprocable within said sleeve, said sleeve and said spool having means providing valve ports for controlling fluid flow between said inlet and outlet ports; first means for effecting movement of said spool; second means connecting said first means to said sleeve, said second means being adjustable to provide for variation of the amount of movement of said sleeve through action of said first means, thereby to provide for relative movement of said spool and said sleeve to provide control of said valve ports.

2. Means for controlling operation of fluid cylinder means, comprising: a valve body having a bore communicating with fluid inlet and outlet ports; a sleeve reciprocable within said bore; a spool reciprocable within said sleeve, said sleeve and said spool having means providing valve ports for controlling fluid flow between said inlet and outlet ports; cam means for effecting movement of said spool; link means generally movable with said spool; a pivotal member connected to said link means; and means adjustable relative to the pivot of said pivotal member, establishing adjustable connection between said pivotal member and said sleeve, whereby said spool and said sleeve may be moved generally in unison or relative to each other depending upon the position of said adjustable connection.

3. Means for controlling operation of fluid cylinder means, comprising: a valve body having a bore communicating with fluid inlet and outlet ports; a sleeve reciprocable within said bore; a spool reciprocable within said sleeve, said sleeve and said spool having means providing valve ports for controlling fluid flow between said inlet and outlet ports; cam means for effecting movement of said spool; link means generally movable with said spool; a pivotal member connected to said link means; means adjustable relative to the pivot of said pivotal member, establishing adjustable connection between said pivotal member and said sleeve, whereby said spool and said sleeve may be moved generally in unison or relative to each other depending upon the position of said adjustable position; and means to vary the effective relative position of said link means, to provide control of valve port openings at the start of movement caused by said cam means.

4. Means for controlling operation of fluid cylinder means, comprising a valve body having a bore communicating with fluid inlet and outlet ports, a pair of means movable within said bore and movable relative to each other, said pair of means controlling flow of fluid between said inlet and outlet ports, first operating means engageable with one of said pair of means at one end of said bore, and second operating means engageable with the other of said pair of means at the opposite end of said bore, said first and second operating means being interconnected so that movement of one effects movement of the other.

5. Means for controlling operation of fluid cylinder means, comprising a valve body having a bore communicating with fluid inlet and outlet ports, a sleeve axially reciprocable within said bore, a spool axially reciprocable within said sleeve, said sleeve and spool providing valve ports for controlling flow of fluid between said inlet and outlet ports, first operating means at one end of said bore for effecting axial movement of said spool, second operating means at the other end of said bore for effecting axial movement of said sleeve, and means interconnecting said first and second operating means, and being adjustable whereby said sleeve and spool may move in unison or may move at varying differential speeds.

6. Means for controlling operation of a fluid cylinder, comprising a valve body having a bore communicating with fluid inlet and outlet ports, a sleeve axially reciprocable within said bore, a spool axially reciprocable within said sleeve, said sleeve and spool providing valve ports for controlling flow of fluid between said inlet and outlet ports, first operating means at one end of said bore for effecting axial movement of said spool, second operating means at the other end of said bore for effecting axial movement of said sleeve, and means interconnecting said first and second operating means and being adjustable whereby said sleeve and spool may move in unison or may move at varying differential speeds, said interconnecting means including a lost motion connection providing for movement of said spool to a predetermined position prior to any movement of said sleeve.

7. Means for controlling operation of a fluid cylinder, comprising a valve body having a bore communicating with fluid inlet and outlet ports, a sleeve axially reciprocable within said bore, a spool axially reciprocable within said sleeve, link means extending the length of said bore and having pivotal connection with said sleeve at one end of said bore and pivotal connection with said spool at the other end of said bore, at least one of said pivotal connections being adjustable transversely of the line of extent of said link means for adjustment purposes.

8. Means for controlling operation of a fluid cylinder, comprising a valve body having a bore communicating with fluid inlet and outlet ports, a sleeve axially reciprocable within said bore, a spool axially reciprocable within said sleeve, and means correlating movements of said sleeve and spool whereby they may move in unison or at varying differential speeds comprising a first slotted member having connection with one of said sleeve and spool and a second slotted member having connection with the other of said sleeve and spool and having pivotal connection with said first slotted member, and means for shifting such pivotal connection.

9. Means for controlling operation of a fluid cylinder, comprising a valve body having a bore communicating with fluid inlet and outlet ports, a sleeve axially reciprocable within said bore, a spool axially reciprocable within said sleeve, link means having one end connected to said spool at one end of said bore, and means for connecting said link means to said sleeve at the opposite end of said bore comprising a slide box pivotally carried by said valve body and pivotally connected to said link means, a slotted member in juxtaposed position with respect to said slide box and connected to said sleeve, and pivot means shiftably mounted in said slide box and providing a pivot slidable to any selected position in the slot of said slotted member.

10. Hydraulic control apparatus for a flash welder having a normally fixed platen and a movable platen operated by a fluid pressure motor, said apparatus acting to control the movement of the movable platen during a welding cycle and comprising in combination a source of hydraulic fluid under pressure, a valve for controlling the flow of fluid from said source to said motor, said valve having two relatively movable valve elements, a secondary motor, variable motion transmitting mechanism interconnecting said secondary motor and said valve elements to move said valve elements relatively in such manner that the movement of the platen will follow a predetermined position-speed relationship during the flashing period of said cycle.

11. Apparatus in accordance with claim 10 and wherein the variable motion transmitting means interconnecting the secondary motor and the valve elements includes a mechanical interconnection between said secondary motor and one of the said valve elements, the said mechanical interconnection including a fixed pivot and a secondary pivot movable toward and away from said fixed pivot to form a variable fulcrum with respect to the mechanical interconnection and the said valve element.

12. In a hydraulic control for a flash welder having a normally fixed platen and a movable platen, a source of hydraulic fluid under pressure, a fluid pressure operated motor connected to said movable platen for moving the same, a valve having two relatively movable elements for controlling the flow of fluid from said source to said motor, a secondary motor comprising a cam adapted to directly move one of said valve elements, variable motion transmitting means interconnecting the other of the said elements and the said cam, the said means comprising a mechanism having a fixed pivot and a secondary pivot movable toward and away from said fixed pivot to form a variable fulcrum with respect to the mechanism and the said valve element, the arrangement being such that the said movable platen follows a predetermined position-speed relationship during the flashing period of said cycle.

References Cited in the file of this patent

UNITED STATES PATENTS

| Number | Name | Date |
|---|---|---|
| 939,792 | Blumel | Nov. 9, 1909 |
| 955,852 | Coyle | Apr. 26, 1910 |
| 1,258,337 | Imblum | Mar. 5, 1918 |
| 1,741,833 | Ferris | Dec. 31, 1929 |
| 1,892,208 | Ferris et al. | Dec. 27, 1932 |
| 1,938,762 | Haas | Dec. 12, 1933 |
| 1,957,759 | Coates et al. | May 8, 1934 |
| 2,002,007 | Hanson | May 21, 1935 |
| 2,298,051 | Gordon et al. | Oct. 6, 1942 |
| 2,304,784 | Donaldson | Dec. 15, 1942 |
| 2,359,324 | Marcaux | Oct. 3, 1944 |
| 2,361,801 | Towler | Oct. 31, 1944 |
| 2,363,179 | Harrington | Nov. 21, 1944 |
| 2,373,226 | Coates | Apr. 10, 1945 |
| 2,380,705 | Proctor | July 31, 1945 |
| 2,500,450 | Carleton | Mar. 14, 1950 |
| 2,500,538 | Gordon | Mar. 14, 1950 |
| 2,516,449 | Coates | July 25, 1950 |
| 2,640,134 | Doutt | May 26, 1953 |

FOREIGN PATENTS

| Number | Country | Date |
|---|---|---|
| 280,659 | Great Britain | Nov. 24, 1927 |